United States Patent
Papajewski et al.

(10) Patent No.: US 9,346,466 B2
(45) Date of Patent: May 24, 2016

(54) METHOD FOR TRAFFIC-FLOW-CONDITIONED ADAPTATION OF STOPPING PROCESSES TO A SYNTHETICALLY MODULATED SPEED PROFILE ALONG A ROUTE TRAVELLED ALONG BY A VEHICLE AND CONTROL DEVICE FOR CARRYING OUT THE METHOD

(71) Applicant: AUDI AG, Ingolstadt (DE)

(72) Inventors: Jens Papajewski, Unterhausen (DE); Michael Hamacher, Ingolstadt (DE); Felix Toepler, Aachen (DE); Till Uhrner, Aachen (DE); Felix Fahrenkrog, Aachen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/649,314

(22) PCT Filed: Nov. 22, 2013

(86) PCT No.: PCT/EP2013/003527
§ 371 (c)(1),
(2) Date: Jun. 3, 2015

(87) PCT Pub. No.: WO2014/086463
PCT Pub. Date: Jun. 12, 2014

(65) Prior Publication Data
US 2015/0314793 A1 Nov. 5, 2015

(30) Foreign Application Priority Data
Dec. 3, 2012 (DE) .......................... 10 2012 023 561

(51) Int. Cl.
*B60L 9/00* (2006.01)
*B60W 50/00* (2006.01)
*G01C 21/26* (2006.01)

(52) U.S. Cl.
CPC .......... *B60W 50/00* (2013.01); *B60W 50/0097* (2013.01); *G01C 21/26* (2013.01);
(Continued)

(58) Field of Classification Search
USPC ......................................................... 701/22
See application file for complete search history.

(56) References Cited

U.S. PATENT DOCUMENTS 5,913,917 A   6/1999   Murphy
8,290,695 B2  10/2012  Hiestermann et al.
(Continued)

FOREIGN PATENT DOCUMENTS

DE        10243536     4/2004
DE        102007047178 4/2008
(Continued)

OTHER PUBLICATIONS

U.S. Notice of Allowance for related U.S. Appl. No. 14/382,504, issued May 29, 2015, 16 pages.
(Continued)

*Primary Examiner* — Hussein A. Elchanti
(74) *Attorney, Agent, or Firm* — Staas & Halsey LLP

(57) ABSTRACT

A method performs traffic-flow-conditioned adaptation of stopping processes to a synthetically modulated speed profile along a route traveled along by a vehicle. A route is selected on the basis of map data stored in a data record. The route is divided into route segments and a synthetically modulated speed profile is generated for each route segment. While the driver is travelling along at least part of the selected route, the method senses how often and for how long the vehicle stops in the route segments. The synthetically modulated speed profile is adapted for at least one route segment according to the detected stopping processes.

14 Claims, 8 Drawing Sheets

(52) U.S. Cl.
CPC ............... *B60W2050/0075* (2013.01); *B60W 2050/0089* (2013.01); *B60W 2520/10* (2013.01); *B60W 2520/105* (2013.01); *B60W 2550/402* (2013.01); *Y02T 10/84* (2013.01)

(56) References Cited

U.S. PATENT DOCUMENTS

| | | | |
|---|---|---|---|
| 8,370,012 B2 | 2/2013 | Yamada et al. | |
| 8,554,473 B2 | 10/2013 | Arcot et al. | |
| 8,615,361 B2 | 12/2013 | Papajewski et al. | |
| 8,825,243 B2 | 9/2014 | Yang et al. | |
| 8,838,377 B2* | 9/2014 | Serbanescu | G01C 21/30 701/410 |
| 9,235,993 B2* | 1/2016 | Serbanescu | G01C 21/32 |
| 2007/0219683 A1 | 9/2007 | Daum et al. | |
| 2010/0087977 A1 | 4/2010 | Bonne | |
| 2010/0235030 A1 | 9/2010 | Xue et al. | |
| 2010/0250127 A1* | 9/2010 | Hilbrandie | G01C 21/32 701/533 |
| 2010/0305798 A1* | 12/2010 | Phillips | B60W 40/09 701/22 |
| 2011/0005486 A1 | 1/2011 | Nakamura | |
| 2011/0106370 A1* | 5/2011 | Duddle | G06Q 40/08 701/31.4 |
| 2011/0166731 A1 | 7/2011 | Kristinsson et al. | |
| 2011/0184622 A1 | 7/2011 | Yamada et al. | |
| 2011/0307165 A1 | 12/2011 | Hiestermann et al. | |
| 2012/0035791 A1 | 2/2012 | Bottlang et al. | |
| 2012/0078467 A1 | 3/2012 | Schweikl et al. | |
| 2013/0073113 A1 | 3/2013 | Wang et al. | |
| 2013/0261970 A1* | 10/2013 | Papajewski | G01C 21/32 701/540 |
| 2014/0058673 A1* | 2/2014 | Wolf | G01C 21/3469 701/533 |
| 2015/0046132 A1 | 2/2015 | Papajewski et al. | |
| 2015/0344036 A1* | 12/2015 | Kristinsson | B60W 40/06 701/22 |

FOREIGN PATENT DOCUMENTS

| | | |
|---|---|---|
| DE | 102007007955 | 8/2008 |
| DE | 102007036794 | 2/2009 |
| DE | 102007059120 | 6/2009 |
| DE | 102008010558 | 9/2009 |
| DE | 102008035944 | 4/2010 |
| DE | 102008055656 | 5/2010 |
| DE | 102009014591 | 10/2010 |
| DE | 102009026950 | 12/2010 |
| DE | 102010015342 | 10/2011 |
| DE | 102010041537 | 3/2012 |
| DE | 102010047080 | 4/2012 |
| DE | 10 2012 023 561.5 | 12/2012 |
| DE | 102012004258 | 9/2013 |
| WO | 2009/071369 | 6/2009 |
| WO | PCT/EP2013/003527 | 11/2013 |

OTHER PUBLICATIONS

WIPO provided English language translation of the Written Opinion of the International Searching Authority for related International Patent Application No. PCT/EP2013/000531, mailed Sep. 12, 2014, 7 pages.
German Office Action for related German Patent Application No. 10 2012 004 258.2, issued Nov. 19, 2012, 8 pages.
English language the International Search Report for PCT/EP2013/000531, mailed Jan. 23, 2014, 3 pages.
German Office Action for German Priority Patent Application No. 10 2012 023 561.6, issued Oct. 15, 2013, 7 pages.
English language International Search Report for PCT/EP2013/003527, mailed Mar. 5, 2014, 3 pages.
Grundlagen der Messtechnik—Teil 3, Auswertung von Messungen einer einzigen Messgröße—Messunsicherheit (Fundamentals of measurement—Part 3, evaluation of Measurements of a single measure—Uncertainty), Norm DIN (German Institute for Standardization), vol. 1319-3, May 1996, 26 pages (Machine English Language Translation 20 pages).
Grundlagen der Messtechnik—Teil 4, Auswertung von Messungen einer einzigen Messgröße—Messunsicherheit (Fundamentals of measurement—Part 4, evaluation of Measurements of a single measure—Uncertainty), Norm DIN (German Institute for Standardization), vol. 1319-4, Feb. 1999, 38 pages (Machine English Language Translation 22 pages).
WIPO English Language Translation of the International Preliminary Report on Patentability for PCT/EP2013/003527, downloaded from WIPO website on Jun. 3, 2015, 5 pages.
U.S. Appl. No. 14/382,504, filed Sep. 2, 2014, Jens Papajewski et al., Audi AG.

* cited by examiner

-- Speed from the digital map
— Vehicle speed
Definition of stopping process

METHOD FOR TRAFFIC-FLOW-CONDITIONED ADAPTATION OF STOPPING PROCESSES TO A SYNTHETICALLY MODULATED SPEED PROFILE ALONG A ROUTE TRAVELLED ALONG BY A VEHICLE AND CONTROL DEVICE FOR CARRYING OUT THE METHOD

CROSS REFERENCE TO RELATED APPLICATIONS

This application is based on and hereby claims priority to International Application No. PCT/EP2013/003527 filed on Nov. 22, 2013 and German Application No. 10 2012 023 561.5 filed on Dec. 3, 2012, the contents of which are hereby incorporated by reference.

BACKGROUND

The present invention relates to a method for traffic-flow-conditioned adaptation of stopping processes to suit a synthetically modulated speed profile along a path taken by a vehicle and to a controller for performing the method.

At present, the motor control or operating strategy of motor vehicles, particularly of electrified vehicles or (plug-in) hybrid vehicles, quite predominantly involves the use of up-to-date sensor data for controlling the drive train.

In the case of plug-in hybrid vehicles, control of the drive train on the basis of the up-to-date sensor data is effected, according to the related art today, by an operating mode switch that can be used to change over between purely electric driving and hybrid driving. In the case of designs with a range extender, the "SOC preservation" (SOC=State of Charge) mode of operation is furthermore also known, in which the state of charge of the battery is preserved.

However, what is conventionally not taken into account for the motor control or operating strategy of motor vehicles is the total scheduled course of a journey. This is disadvantageous insofar as it does not allow the motor control or operating strategy to be optimally matched to the scheduled course.

To overcome this disadvantage, various methods have been developed. By way of example, DE 10 2008 035 944 A1 discloses a method for optimizing the operation of a motor vehicle on the basis of a plurality of parameters, wherein a journey route of the vehicle is ascertained by prescribing a journey destination, a plurality of different path parameters that are characteristic of a path profile for the ascertained journey route of the vehicle between the geometric location or a journey starting point for the vehicle and the journey destination are ascertained, and at least one driving condition is ascertained that is characteristic of the ascertained journey route of the vehicle between the geometric location of the vehicle or the journey starting point and the journey destination. By taking account of the path parameters and the driving condition, a setpoint speed of travel of the vehicle along the ascertained journey route is determined, the journey route being divided into a plurality of segments and the division of the journey route into segments taking place on the basis of the path parameters and/or the driving condition.

DE 10 2007 036 794 A1 discloses a method and an apparatus for stipulating the driving strategy of a motor vehicle, wherein for a prescribed route of travel a corridor is defined for a possible setpoint speed of travel with an upper and a lower speed limit over the path of travel.

DE 10 2008 010 558 A1 describes an apparatus and a method for operating a hybrid drive apparatus for a motor vehicle, which hybrid drive apparatus has at least two different drive units, particularly an internal combustion engine and an electric machine, wherein an operating strategy is set for the drive units on the basis of a path of travel, the path of travel being taken and at least one driving profile being ascertained and stored and the driving profile being taken as a basis for influencing the operating strategy when the path of travel is taken again.

US 2011/0005486 A1 discloses a vehicle control apparatus for a vehicle, which vehicle control apparatus automatically stops an internal combustion engine of a vehicle when a predetermined stop condition is met, and starts the automatically stopped internal combustion engine when a predetermined start condition is met. A stopping point detection unit ascertains a stopping point at which the vehicle possibly stops while the vehicle is travelling on the basis of map information that is stored in a map information memory unit. A trip information control unit stores trip information in a trip information memory unit that comprises a state of the vehicle that stops at a stopping point and a state of the vehicle that passes a stopping point. A stop determination unit takes the trip information stored in the trip information memory unit as a basis for determining whether the internal combustion engine is stopped when the vehicle stops at a stopping point.

DE 10 2010 047 080.5 A1 proposes a method for extracting a data record that reproduces the predicted speed of a vehicle over a multiplicity of points on the path of a route or alternatively assigns a speed to times that are defined for a journey on the route. In both alternatives, the whole of the data record reveals a speed profile.

According to DE 10 2010 047 080.5 A1, a first data record is first of all provided that assigns points on the path to a multiplicity of paths or routes (route sections) (where possible on a complete road network). In addition, a second data record is provided that defines a plurality of processes, wherein the defining variables provided are at least an input speed and an output speed (maneuver class matrix). In the course of the provision of the second data record, preferably only such processes (maneuvers) as actually arise in each case on the basis of their definition or at least in a similar form are defined. In this context, a process can be compiled from a plurality of subprocesses.

According to DE 10 2010 047 080.5 A1, a predetermined route is selected and, for the route, a provisional speed profile for the journey by a particular vehicle over the predetermined route is ascertained. The route is split, in particular the route is split completely, into path sections, specifically such that each path section is assigned a process (maneuver) from the processes defined in the second data record.

Preferably, the method according to DE 10 2010 047 080.5 A1 involves a plurality of routes being taken and this involving measured values for the vehicle speed being extracted at particular points on the path. The experience that is indirectly reflected in the measured values is then rendered visible in direct fashion by defining a plurality (but preferably a finite number) of processes (maneuvers) that have an associated input speed and an associated output speed, the definition being provided on the basis of the extracted measured values.

The data record for modulation of the speed profile according to DE 10 2010 047 080.5 A1 contains all of the requisite information, such as initial and final speeds, for all maneuvers.

Moreover, DE 10 2012 004 258.2, which is not a prior publication, relates to how the speed and acceleration values that are in the maneuver class matrix are ascertained for the various maneuvers (maneuver classes).

According to the related art, there is therefore currently optimization of the motor control or operating strategy for vehicles, such as electrified vehicles or plug-in hybrid vehicles, over a path only on the basis of a synthetically modulated speed profile without taking account of the actual traffic scenario when taking the selected path.

This is disadvantageous insofar as it means that the maximum consumption potential of a vehicle, particularly of a plug-in hybrid vehicle, cannot be used by the customer.

SUMMARY

One possible object is to overcome this disadvantage of the related art.

The inventors propose a method for traffic-flow-conditioned adaptation of stopping processes to suit a synthetically modulated speed profile along a path taken by a vehicle, that comprises:
a) selection of a path on the basis of map data stored in a data record,
b) splitting of the path into path segments and production of a synthetically modulated speed profile for each path segment,
c) travel along at least one portion of the path by a driver in the vehicle,
d) recording of how often and for how long the vehicle stops in the path segments taken when taking at least one portion of the selected path, and
e) adaptation of at least one synthetically modulated speed profile for at least one path segment to suit the recorded stopping processes.

The proposed method is characterized in that in b) each path segment is assigned a maneuver class, wherein the maneuver classes are selectable from a prescribed maneuver class matrix that contains a number of constant speed maneuver classes, acceleration maneuver classes and deceleration maneuver classes and, for each maneuver class, contains at least an input speed and an output speed of the vehicle, and wherein the maneuver class matrix additionally contains, for each maneuver class, at least an average speed or average acceleration of the vehicle and also a tolerance band for the average speed or average acceleration on the basis of the tally of how often the maneuver class occurs.

The proposed method matches the synthetically modulated speed profile, which is based on a theoretical assumption for a journey route, to the actual traffic scenario and the associated stopping processes in a simple and rapid manner. The method allows the number of stopping processes that have occurred and the average stopping period to be determined for each affected path segment after the journey has ended. If need be, the adaptation of the synthetically modulated speed profile for at least one path segment makes it a simple matter also to customize the operating strategy at least for the remainder of the path that is yet to be taken.

It is additionally advantageous when, in the method, if, for the path segment within which the vehicle stops, according to the association of the maneuver class with the path section, a) there is a constant speed maneuver class, the stopping period is associated with the constant speed maneuver class, b) there is a deceleration maneuver class, the stopping period is associated with the constant speed maneuver class that occurred before the deceleration maneuver class, or c) there is an acceleration maneuver class, the stopping period is associated with the constant speed maneuver class that occurred after the acceleration maneuver class.

According to another advantageous development of the proposal, in the method, the stopping period for each stopping process is stored in a time memory and a maneuver-class-specific counter for the stopping processes is incremented by the value 1.

Hence, after the journey has ended, the number of stopping processes that have occurred and the average stopping period can be determined for each constant speed maneuver class.

The adapted values from at least one synthetically modulated speed profile for at least one path segment can advantageously be used for the predictive operating strategy for the vehicle. By way of example, if the adapted values from at least one synthetically modulated speed profile for at least one path segment result in a prescribable threshold value for an energy-related relevance being exceeded, recomputation of the predictive operating strategy for the vehicle can be performed.

In addition, provision is advantageously made that a) the adapted values are used for at least one path segment for computing the predictive operating strategy for at least one further selected path, or b) the adapted values are reset to the originally prescribed value for at least one path segment after the journey has ended, and the predictive operating strategy for a further selected path is computed on the basis of the originally prescribed values.

The inventors also propose a controller for a vehicle that is set up to perform one of the described method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

Figure 1:
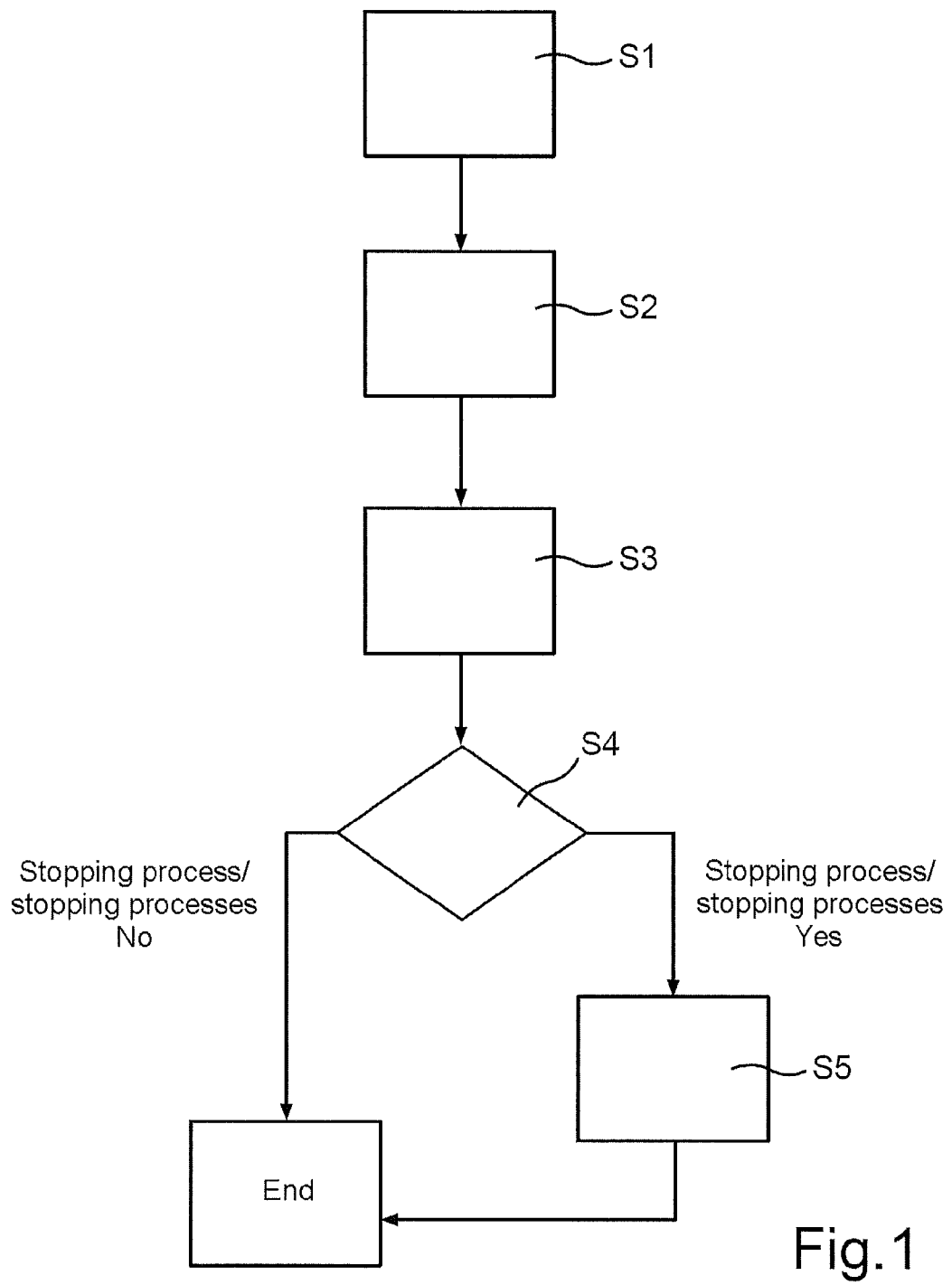
FIG. 1 shows a schematic sequence for the proposed method.

The illustrations in the figures are purely schematic and not to scale.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout. The present invention is naturally not limited to these embodiments.

As FIG. 1 shows, the method provides for S1 to involve a path being selected on the basis of map data stored in a data record, S2 to involve the path being split into path segments and a synthetically modulated speed profile being produced for each path segment, S3 to involve at least one portion of the path being traveled along by a driver in the vehicle, S4 to involve recording of how often and for how long the vehicle stops in the path segments taken when taking at least one portion of the selected path, and S5 to involve at least one synthetically modulated speed profile for at least one path segment being adapted to suit the recorded stopping processes.

If no stopping processes are detected on the path taken or the path sections taken, no adaptation (or non-adaptation) of a synthetically modulated speed profile for a path segment takes place and the method ends after S4.

Figure 2:
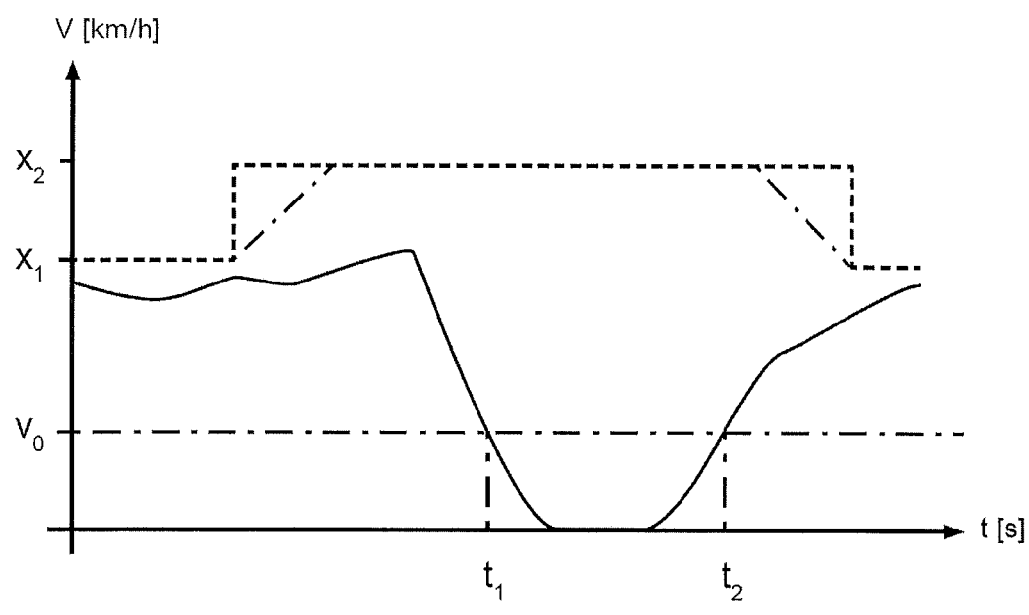
FIG. 2 shows a definition for a stopping process.

Stopping processes are defined as ranges in which the value of the real speed profile is below a particular limit value $v_0$. FIG. 2 shows an exemplary detail from a real speed profile that contains a stopping process.

A drop below the limit value $v_0$ prompts the current time $t_1$ to be buffer-stored. If the limit value $v_0$ is exceeded again at the time $t_2$, the stopping period is ascertained by subtracting $t_2-t_1$.

A prerequisite for the present method is that a synthetically modulated speed profile is existent or is produced for a selected path. An example of how such a speed profile can be produced is described in DE 10 2010 047 080.5 A1.

In the method described in DE 10 2010 047 080.5 A1, each path segment—in accordance with b) of the method—is assigned a maneuver class, the maneuver classes being selectable from a prescribed maneuver class matrix that contains a number of constant speed maneuver classes, acceleration maneuver classes and deceleration maneuver classes and, for each maneuver class, contains at least an input speed and an output speed of the vehicle. A synthetically modulated speed profile for the path can be created from the maneuver classes for the individual path segments.

The method described in the patent application DE 10 2010 047 080.5 A1 takes the forecast data from the navigation (long-range predictive path data, LR-PSD for short) and computes a speed profile that takes account of a maneuver class matrix (a "default" data record). The method according to DE 10 2010 047 080.5 A1 can therefore be used to produce a synthetically modulated speed profile, as is used for the present method. In this respect, express reference is made to the disclosure in DE 10 2010 047 080.5 A1.

Figure 3:
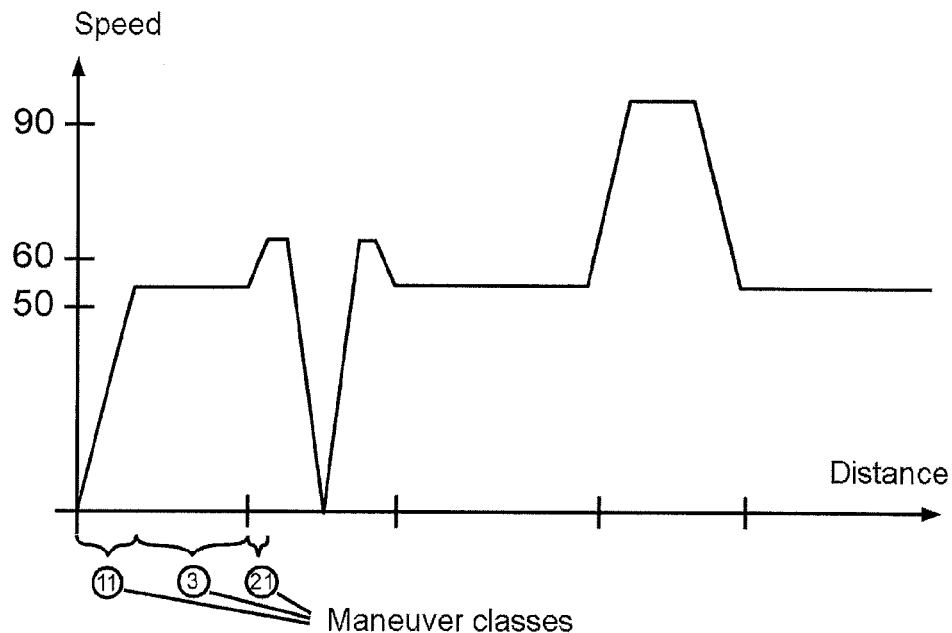
FIG. 3 shows an example of a synthetic speed profile for a selected path.

On the basis of the method according to DE 10 2010 047 080.5 A1, acceleration and deceleration phases for a path and also further events, such as stopping processes, can be incorporated into the profile, so that the speed profile shown in FIG. 3 is obtained, for example.

In this case, the insertion of the stopping processes is based on statistically ascertained values, which means that discrepancies can occur in reality, both as far as the position of the stopping process and as far as the value of deceleration, acceleration and the length of the standstill phases are concerned.

The subject matter of DE 10 2012 004 258.2, which is not a prior publication, is how the speed and acceleration values that are in the maneuver class matrix are ascertained for the different maneuvers (maneuver classes). The technical teaching of DE 10 2012 004 258.2 can be used to additionally ascertain, for each maneuver class in the maneuver class matrix, at least an average speed or average acceleration of the vehicle and also a tolerance band for the average speed or average acceleration on the basis of the tally of how often the maneuver class occurs.

Since the technical teaching of DE 10 2012 004 258.2—can be used advantageously, the important content of this patent application, which is not a prior publication, is inserted below to assist comprehension of the latest proposals:

The method according to DE 10 2012 004 258.2 for ascertaining a prediction quality factor surrounding a predicted energy consumption by a motor vehicle involves the following:
a) provision of a plurality of maneuver classes that have at least an associated input speed and an associated output speed of a vehicle as defining variables;
b) repeated execution of the maneuver for each maneuver class by a driver in the motor vehicle and ascertainment of mean values for speed or speed change on the basis of the number of repetitions of the maneuver;
c) repetition of b) at least until a statistically meaningful mean value for speed or speed change is obtained for each maneuver;
d) computation of a tolerance range for the mean values of each maneuver with maximum and minimum values for the average speed or the average acceleration on the basis of the number of repetitions of each maneuver;
e) selection of a predetermined route on the basis of a second data record that defines a plurality of paths with a multiplicity of path segments;
f) assignment of at least one maneuver class to each path segment of the route;
g) computation of the predicted energy consumption for the route by addition of the predicted energy consumption of the vehicle for each maneuver performed along each path segment using the ascertained, statistically meaningful mean value for speed or speed change for each maneuver, and
h) computation of a tolerance band for the maximum and minimum energy consumption by addition of the energy consumption of the vehicle for each maneuver performed along each path segment using the maximum and minimum mean values ascertained in d) for the speed or the acceleration on the basis of the number of repetitions of the maneuver, with use of the formula for Gaussian error propagation compensating for discrepancies within and/or between different maneuver classes.

In accordance with a first development of the method according to DE 10 2012 004 258.2, the data obtained in b) to d) for each maneuver class are stored in a first data record. This makes it possible to ensure that these data are continually available for further use.

In accordance with a further development of the method according to DE 10 2012 004 258.2, recomputation or alteration of the operating strategy of the vehicle is performed only if the actual energy consumption of the vehicle has a value outside the computed tolerance band. While the driver is in the predicted tolerance band of the driving profile during a real journey, there is no need to recompute or change the operating strategy. The fuel consumption (for example electric current, hydrocarbon-containing fuel, such as petrol, diesel, natural gas, liquid gas and/or hydrogen) is minimized on the prescribed path using the predictive operating strategy.

In accordance with yet a further development of the method according to DE 10 2012 004 258.2, the first and second data records are stored in a memory of a motor vehicle, e) is effected using an operator control apparatus in the motor vehicle and b) to d) and f) to h) are performed using a data processing device of the motor vehicle.

In accordance with yet a further development of the method according to DE 10 2012 004 258.2, the recomputation or alteration of the operating strategy of the vehicle is also performed by a data processing device of the motor vehicle.

Yet a further development of the method according to DE 10 2012 004 258.2 provides for the data record provided in e) above also to contain a piece of information about the type of roads and for this information to be taken into account in f) above.

It is also possible, as provided in accordance with yet a further development of the method according to DE 10 2012 004 258.2, that the data record provided in e) above also should contain information about the height of path segments and for this information to be taken into account in f) above.

In addition, DE 10 2012 004 258.2 describes an apparatus having a memory, an operator control apparatus and a data processing device, wherein
a) the memory stores a plurality of maneuver classes that have at least an associated input speed and an associated output speed of a vehicle as defining variables;
b) the memory stores mean values for speed or speed change on the basis of the number of repetitions of the maneuver that have been ascertained by repeated execution of the maneuver from each maneuver class by a driver in the vehicle;
c) the memory stores a statistically meaningful mean value for speed or speed change for each maneuver, said mean value being obtained by sufficiently frequent repetition of each maneuver;
d) the memory stores a tolerance range for the mean values of each maneuver with maximum and minimum values for the average speed or the average acceleration on the basis of the number of repetitions of each maneuver;
e) the memory stores a second data record that defines a plurality of paths with a multiplicity of path segments;
f) the operator control apparatus can be used to select a predetermined route on the basis of the second data record, which defines a plurality of paths with a multiplicity of path segments;
g) the data processing device can assign at least one maneuver class to each path segment of the route;
h) the data processing device can compute the predicted energy consumption for the route by addition of the predicted energy consumption of the vehicle for each maneuver performed along each path segment using the ascertained, statistically meaningful mean value for speed or speed change for each maneuver, and
i) the data processing device can compute a tolerance band for the maximum and minimum energy consumption by the addition of energy consumption of the vehicle for each maneuver performed along each path segment using the maximum and minimum mean values for the speed or the acceleration of each maneuver on the basis of the number of repetitions of the maneuver, with use of the formula for Gaussian error propagation compensating for discrepancies within and/or between different maneuver classes.

A first development of the apparatus in accordance with DE 10 2012 004 258.2 provides for the data processing device additionally to be set up to perform recomputation or alteration of the operating strategy of the vehicle when the actual energy consumption of the vehicle has a value outside the predicted tolerance band.

In accordance with a further development of the apparatus according to DE 10 2012 004 258.2, the data record stored in the memory, which data record defines a plurality of paths with a multiplicity of path segments, also contains a piece of information about the type of roads and the data processing device is set up to take account of this information in point g).

In accordance with yet a further development of the apparatus according to DE 10 2012 004 258.2, the data record stored in the memory, which data record defines a plurality of paths with a multiplicity of path segments, also contains a piece of information about the height of path segments and the data processing device is set up to take account of this information in point g).

Finally, DE 10 2012 004 258.2 also describes a motor vehicle having the above apparatus.

In accordance with DE 10 2012 004 258.2, the ascertainment of a tolerance band, what is known as the prediction quality factor, also computes a tolerance band in addition to the predicted driving profile. The prediction quality factor provides a statement for the whole route about whether a driver is in a naturally occurring tolerance band that is based on stochastic evaluation. The operating strategy for the vehicle takes account of precisely this tolerance band for optimization.

While the driver is in the predicted tolerance band of the driving profile during the real journey, there is no need to recompute or change the operating strategy. This minimizes fuel consumption on the prescribed route using the predictive operating strategy.

As described in DE 10 2010 047 080.5 A1, the speed profile of each route can be described by particular maneuver classes (referred to as "processes" in DE 10 2010 047 080.5 A1). Examples of such maneuver classes that may be mentioned here are acceleration from 50 to 100 km/h, constant speed at 70 km/h or deceleration from 50 to 30 km/h. On the basis of knowledge to date, a number of approximately 100 different maneuvers is sufficient in order to be able to describe the speed profile for any desired route with sufficient precision. Every maneuver class contains at least an input speed and an output speed of a vehicle as defining variables.

In accordance with DE 10 2012 004 258.2, an evaluation is made for each maneuver class, which evaluation involves the average speed or average speed change by a driver in a vehicle being stored. The values ascertained during the evaluation are preferably stored in what is known as a maneuver class matrix.

The mean value, i.e. the value for the average speed or average speed change, fluctuates a great deal in the case of a small number of maneuvers on account of the small sample.

As the number of maneuvers increases, this mean value approaches a fixed value, however. The stochastically computed constancy value (for example n=41) is the minimum number for which a maneuver needs to be run in order to obtain a statistically meaningful mean value for average speed or acceleration in the maneuver.

The constancy value can be computed on the basis of the formula for the "minimum sample size":

$$n_{Constancy} = t_{0.995}^2 \cdot \frac{s_{a_\phi}^2}{b_a^2}$$

or $$n_{Constancy} = t_{0.995}^2 \cdot \frac{s_{v_\phi}^2}{b_v^2}$$

For the mean values, a tolerance band is ascertained in accordance with DE 10 2012 004 258.2. As a result, a maximum value and a minimum value for the average acceleration and speed are obtained on the basis of the tally of how often a maneuver occurs. The boundaries are computed using the stochastic approach of "measurement uncertainty". This measurement uncertainty indicates the range around the mean value that contains a value with a previously stipulated probability on the basis of the measured values.

$$a_{\phi,max}/a_{\phi,min} = \bar{a}_\phi \pm \Delta a_\phi = \bar{a}_\phi \pm t_a \cdot \frac{s_{a_\phi}}{\sqrt{n}} = \bar{a}_\phi \pm t_a \cdot s_{\bar{a}_\phi}$$

or $$v_{\phi,max}/v_{\phi,min} = \bar{v}_\phi \pm \Delta v_\phi = \bar{v}_\phi \pm t_v \cdot \frac{s_{v_\phi}}{\sqrt{n}} = \bar{v}_\phi \pm t_v \cdot s_{\bar{v}_\phi}$$

The algorithm interprets the speed profile of any route as a juxtaposition of maneuver classes. For each segment of a route, it is thus possible to predict an average value (for speed or acceleration) and also the maximum acceptable discrepancies from a stochastic point of view. With the average values (mean value when n=constancy), it is possible to use the equations for the resistance to motion to predict an energy consumption over the path.

The acceptable discrepancies and the stochastic approach developed in DE 10 2012 004 258.2, which approach is based on "Gaussian error propagation", can be used to predict what discrepancies from the predicted energy consumption can arise.

The "Gaussian error propagation" is computed on the basis of the following approach:

$$\Delta f = \sqrt{\sum_{i=1}^{n} \left( \frac{\delta f}{\delta x_i}\bigg|_{x_i} \cdot \Delta x_i \right)^2}$$

where $x_i$ are the individual measured variables that influence the final variable that is computed by the function f. For the energy computation, the constancy values for the speed or the acceleration from the individual maneuver classes are the measured variables. If the maneuver class is an acceleration or deceleration, the energy is computed as follows:

$$\sum E = E_{MKx} + E_{MKy} + E_{MKz} + \ldots$$
$$= \sum ((k_{m_{rot}} + m_{Fzg}) \cdot a_{Constancy} + m_{Fzg} \cdot g \cdot$$
$$\sin(\tan^{-1}(\Delta h/\Delta s)) + F_0 + F_1 \cdot v_\phi + F_2 \cdot v_\phi^2) \cdot \Delta s \cdot \eta$$
$$= \sum ((k_{m_{rot}} + m_{Fzg}) \cdot a_{Constancy} + m_{Fzg} \cdot g \cdot \sin$$
$$(\tan^{-1}(2 \cdot a_{Constancy} \cdot \Delta h / (v_E^2 - v_A^2))) + F_0 + F_1 \cdot v_\phi +$$
$$F_2 \cdot v_\phi^2) \cdot \left( \frac{v_E^2 - v_A^2}{2 \cdot a} \right) \cdot \eta$$

with $$\Delta s = \frac{v_E^2 - v_A^2}{2 \cdot a_{Constancy}}$$

from $$v_E^2 = \sqrt{v_A^2 + 2 \cdot a_{Constancy} \cdot \Delta s}$$

Constancy = Constancy

As a partial derivation based on $a_{Constancy}$, the following is computed:

$$\sum \frac{\delta E}{\delta a_{Constancy}} = \sum (((k_{m_{rot}} + m_{Fzg}) + m_{Fzg} \cdot g \cdot$$
$$\cos\left(\tan^{-1}\left(\frac{2 \cdot a_{Constancy} \cdot \Delta h}{v_E^2 - v_A^2}\right)\right) \cdot$$
$$\left(\frac{1}{1 + \left(\frac{2 \cdot a_{Constancy} \cdot \Delta h}{v_E^2 - v_A^2}\right)^2}\right) \cdot \left(\frac{2 \cdot \Delta h}{v_E^2 - v_A^2}\right) \cdot$$
$$\left(\frac{v_E^2 - v_A^2}{2 \cdot a_{Constancy}}\right) + ((k_{m\_rot} + m_{Fzg}) \cdot a_{Constancy} +$$
$$m_{Fzg} \cdot g \cdot \sin\left(\tan^{-1}\left(\frac{2 \cdot a_{Constancy} \cdot \Delta h}{v_E^2 - v_A^2}\right)\right) +$$
$$F_0 + F_1 \cdot v_\phi + F_2 \cdot v_\phi^2) \cdot \left(-\frac{v_E^2 - v_A^2}{2 \cdot a^2}\right)) \cdot \eta$$
$$= \sum \Bigg(((k_{m_{rot}} + m_{Fzg}) + m_{Fzg} \cdot g \cdot \cos\left(\tan^{-1}\left(\frac{\Delta h}{\Delta s}\right)\right) \cdot$$
$$\left(\frac{1}{1 + \left(\frac{\Delta h}{\Delta s}\right)^2}\right) \cdot \left(\frac{2 \cdot \Delta h}{v_E^2 - v_A^2}\right)\Bigg) \cdot \Delta s +$$
$$\left((k_{m\_rot} + m_{Fzg}) \cdot a_{Constancy} + m_{Fzg} \cdot g \cdot \sin\left(\tan^{-1}\left(\frac{\Delta h}{\Delta s}\right)\right)\right) +$$
$$F_0 + F_1 \cdot v_\phi + F_2 \cdot v_\phi^2) \cdot \left(-\frac{v_E^2 - v_A^2}{2 \cdot a^2}\right)\Bigg) \cdot \eta$$

For constant speed, the energy is computed on the basis of $$\sum E = E_{MKx} + E_{MKy} + E_{MKz} + \ldots$$
$$= \sum (m_{Fzg} \cdot g \cdot \sin(\tan^{-1}(\Delta h/\Delta s)) + F_0 +$$
$$F_1 \cdot v_{Constancy} + F_2 \cdot v_{Constancy}^2) \cdot \Delta s \cdot \eta$$

In a partial derivation based on $v_{Constancy}$, the following is obtained:

$$\sum \frac{\delta E}{\delta v_{Constancy}} = (2 \cdot F_2 \cdot v_{Constancy} + F_1) \cdot \Delta s \cdot \eta$$

The possible discrepancies in the predicted total energy consumption ΣE are then computed from the individual terms for the maneuver classes:

$$\Delta \sum E = \sqrt{\sum \frac{\delta E}{\delta a_{Constancy}}\bigg|_{a_{Constancy}} \cdot \Delta a_\phi + \sum \frac{\delta E}{\delta v_{Constancy}}\bigg|_{v_{Constancy}} \cdot \Delta v_\phi}$$

The evaluation takes place on a maneuver class basis, that is to say that after every maneuver class a new term is added. The value for the measurement uncertainty $\Delta a_\sigma$ or $\Delta v_\sigma$ is obtained on the basis of the tally for the maneuver class.

So long as a maneuver class occurs only once during the journey, the value for n=1 is used. As soon as the maneuver class occurs a second time, the value for n=2 is used for both terms, the value for the measurement uncertainty and hence the predicted discrepancy becomes smaller as a result.

This keeps in mind that the mean value for the acceleration or speed of a maneuver class approaches the constancy value to an ever greater extent as the tally rises. In reality, this means that the driver will, from a statistical point of view, accelerate to an alternately greater or lesser extent during a journey on account of external and internal influences, such as a traffic queue or a hurry. However, this balances itself out all the more the more often he performs this acceleration. In addition, the quadratic addition of the formula for Gaussian error propagation also keeps in mind that discrepancies within and/or between different maneuver classes also compensate for one another. This approach in accordance with DE 10 2012 004 258.2 means that the discrepancies to be tolerated over the path increase only slightly, and sometimes the tolerance band even becomes narrower as a result of the compensation.

The approach described above therefore allows the tolerance band, what is known as the prediction quality factor, to be placed around the predicted energy consumption. The discrepancies from the predicted energy consumption that are within the tolerance band of the approach can be tolerated and require no recomputation or alteration of the operating strategy.

(End of reproduction of the important content of the patent application DE 10 2012 004 258.2, which is not a prior publication)

As a result of the method, a synthetically modulated speed profile is adapted to suit the actual sequence of a journey along a selected path. The adapted values, produced during a journey, for at least one synthetically modulated speed profile for at least one path segment can advantageously be used for the predictive operating strategy for the vehicle.

By way of example, if the adapted values from at least one synthetically modulated speed profile for at least one path segment result in a prescribable threshold value for an energy-related relevance being exceeded, recomputation of the predictive operating strategy for the vehicle can be performed.

For the threshold value, there are no special limitations and, by way of example, it is possible to assume "energy-related relevance" when the energy consumption for the selected path is—owing to the stopping processes that actually occur—1, 2, 3, 4, 5, 6, 7, 8, 9, 10, 15 or 20% above or below that which has been computed in advance for a selected path on the basis of the "default" values in the maneuver class matrix.

By way of example, the adapted values for at least one path segment can a) be used for computing the predictive operating strategy for at least one further selected path or b) be reset to the originally prescribed value after the journey has ended. In the latter case, the computation of the predictive operating strategy for a further selected path is then effected on the basis of the originally prescribed values.

By way of example, option a) can then be used for realistic advance computation of the necessary energy requirement for taking a selected path and hence computing the best possible operating strategy when a further path having a similar path profile (portions on urban roads, country roads, freeways, etc.) and a similar number of the individual maneuver classes that can be derived from the map data is selected. This may also involve the time of day at which the further path is intended to be taken being compared with the time of day at which the previous path was taken (e.g. both paths are taken during rush-hour traffic). In such cases, it can be expected that the number and length of the stopping processes for each constant speed maneuver class will be similar for both paths, so that the effect of the stopping processes in terms of the energy-related relevance thereof will also be similar.

In other cases, for example when a further path with a path profile that is significantly different than the first path is selected, there is a change of driver or travel is on a further path at a time at which a different volume of traffic can be expected than when taking the first path, it will often be advantageous to select option b) above.

It is advantageous if the adapted values are recorded as an offset rather than as an absolute value. This allows, by way of example, the maneuver class matrix to be reset to the "default" data input and what has been learned to be rejected if it is identified that what has been learned is flawed or obsolete.

When storing absolute values, the "default" data input would need to be overwritten and it would not be possible to reset the database. Alternatively, it would be possible to reset the database only through separate storage of the default maneuver class matrix, which results in double the memory requirement (for example in a controller), however. Depending on the application, the proposals allow both methods to be applied (storage of an offset or of absolute values; with and without separate storage of the default maneuver class matrix), however.

Also proposed is a controller for a vehicle that is set up to perform the method or one of the advantageous developments thereof. Since the components that are required for the controller, and the function and interaction of said components are quite evident to a person skilled in the art from the depiction of the method and the advantageous developments thereof, these do not need to be discussed in more detail at this juncture.

By way of example, the controller can have a memory device, an operator control device, a data processing device and a measurement data capture device, wherein a) the operator control apparatus can be used to select a path on the basis of map data, wherein the map data are either stored in the memory device or based on data from a navigation system;

b) the data processing device can be used to split the path into path segments and to compute a synthetically modulated speed profile for each path segment;

c) the measurement data capture device can be used to record how often and for how long the vehicle stops in the path segments taken when taking at least one portion of the selected path; and e) the data processing device can be used to store the number of stopping processes that have occurred and the average stopping period in the memory device or to adapt at least one synthetically modulated speed profile for at least one path segment to suit the recorded stopping processes.

In addition, the controller is also set up to be able to assign a maneuver class to each path segment, wherein the maneuver classes are selectable from a prescribed maneuver class matrix that is stored in the memory device and that contains a number of constant speed maneuver classes, acceleration maneuver classes and deceleration maneuver classes and, for each maneuver class, contains at least an input speed and an output speed of the vehicle.

The controller is also set up such that the maneuver class matrix additionally contains, for each maneuver class, at least an average speed or average acceleration of the vehicle and also a tolerance band for the average speed or average acceleration on the basis of the tally of how often the maneuver class occurs.

In addition, the controller may be set up such that if, for the path segment within which the vehicle stops, according to the association of the maneuver class with the path section, a) there is a constant speed maneuver class, the stopping period is associated with the constant speed maneuver class, b) there is a deceleration maneuver class, the stopping period is associated with the constant speed maneuver class that occurred before the deceleration maneuver class, or c) there is an acceleration maneuver class, the stopping period is associated with the constant speed maneuver class that occurred after the acceleration maneuver class.

The controller may also be set up to store the stopping period for each stopping process in the memory device and to increment a maneuver-class-specific counter for the stopping processes by the value 1.

The controller may advantageously also be set up to use the adapted values from at least one synthetically modulated speed profile for at least one path segment for the predictive operating strategy for the vehicle. It is thus possible for the controller, for example if the adapted values from at least one synthetically modulated speed profile for at least one path segment result in a prescribable threshold value for an energy-related relevance being exceeded, to perform recomputation of the predictive operating strategy for the vehicle.

In addition, provision may be made for, by way of example, the operator control device to be able to be used to select whether the adapted values a) are used for at least one path segment for computing the predictive operating strategy for at least one further selected path, or b) are reset to the originally prescribed value after the journey has ended, and the predictive operating strategy for a further selected path is computed on the basis of the originally prescribed values.

Furthermore, provision may advantageously be made for the data processing device provided in the controller to customize the values for a maneuver class by entering corresponding offset values into the memory device.

In addition to the recording of how often and for how long a vehicle stops along a selected path, it may be of great advantage, particularly for computing an optimum operating strategy for a vehicle at least for the selected path, if additionally the driving style of the driver is also recorded and analyzed. Therefore, the method and the controller can, if need be, advantageously be extended or augmented by the recording and analysis of the driving style of the driver that is set out below.

As already mentioned above, there is, on the basis of the related art, currently optimization of the motor control or operating strategy for vehicles, such as plug-in hybrid vehicles, over a path merely on the basis of a synthetically modulated speed profile without taking account of the actual traffic scenario when taking the selected path. The optimization is also performed on the assumption that a "default" driver is driving the vehicle, who performs all the maneuvers on the path with "default" values.

It is therefore advantageous if, in addition to the recording of traffic-flow-conditioned stopping processes, driver-specific customization of a synthetically modulated speed profile also takes place.

By way of example, such driver-specific customization can take place by virtue of a) a path being selected on the basis of map data stored in a data record, b) the path being split into path segments and a maneuver class being assigned to each path segment, the maneuver classes being selectable from a prescribed maneuver class matrix that contains, for each maneuver class, at an input speed, an output speed, an average speed or average acceleration of the vehicle and also a tolerance band for the average speed or average acceleration on the basis of the tally of how often the maneuver class occurs, c) at least one portion of the path being traveled along by a driver in the vehicle, each path segment taken involving the actual speed or the actual acceleration and also the tally of how often the maneuver class has occurred along the path being recorded, d) ascertainment of whether, in relation to the tally of how often the maneuver class has occurred, the actual speed or the actual acceleration lies outside the tolerance band prescribed for the tally of the maneuver class in the maneuver class matrix, and e) the average speed or average acceleration, and also the tolerance band, that the maneuver class matrix for the maneuver class contains being customized if, in relation to the tally of how often the maneuver class has occurred, the actual speed or the actual acceleration lies outside the tolerance band prescribed for the maneuver class in the maneuver class matrix.

As already mentioned above, DE 10 2010 047 080.5 A1 proposes a method for extracting a data record that reproduces the predicted speed of a vehicle over a multiplicity of points on the path of a route or alternatively assigns the speed to times that are defined for a journey on the route. The data record as a whole results in a speed profile for both alternatives. Moreover, the subject matter of DE 10 2012 004 258.2, which is not a prior publication, is how the speed and acceleration values that are in the maneuver class matrix are ascertained for the different maneuvers (maneuver classes). For the explanations that follow, reference is made in this regard to DE 10 2010 047 080.5 A1 and to the explanations above with respect to DE 10 2012 004 258.2.

The maneuver class matrix, stored on the basis of DE 10 2010 047 080.5 A1 and/or DE 10 2012 004 258.2, for modulating the predictive speed profile depicts only an average driver. However, a self-teaching algorithm can analyze the individual driver behavior and store it in the maneuver class matrix. In the case of energy-related relevance, recomputation of the predictive operating strategy can be initiated.

This results in the advantage that a desired remaining range can be provided by making optimum use of vehicles, particularly of plug-in hybrid vehicles, in terms of consumption, costs and customer requirements. The predictive operating strategy takes account of customer requirements in optimum fashion and automatically adapts itself to suit the individual driving behavior of the driver.

In this context, it may be advantageous if in e) above the values for a maneuver class are customized by entering offset values into the maneuver class matrix. Recording the driving-style-dependent alteration as an offset rather than as an absolute value in the maneuver class matrix affords the advantage that the maneuver class matrix can be reset to the "default" data input again and what has been learned can be rejected. When storing absolute values, the "default" data input would need to be overwritten and it would be possible to reset the database only by separate storage of the default maneuver class matrix, which results in double the memory requirement, however.

It is also advantageous if, when customizing the values for at least one maneuver class, the customized values are used for the predictive operating strategy for the vehicle. By way of example, if customization of the values from at least one maneuver class exceeds a prescribable threshold value for an energy-related relevance, it is possible to perform recomputation of the predictive operating strategy for the vehicle.

Similarly, it is advantageous if a) the customized values are used for computing the predictive operating strategy for at least one further selected path or b) the customized values in the maneuver class matrix are reset to the originally prescribed value after the journey has ended, and the predictive operating strategy for a further selected path is computed on the basis of the originally prescribed values.

According to option a) above, what has been learned can, on the assumption that the driver maintains his previous driving style for the respective maneuver classes, be used for computing a predictive operating strategy for at least one further selected path. Alternatively, what has been learned to date can immediately be used for recomputing the operating strategy or the motor control if the driver decides to leave the selected route and drive to a new destination via an amended route.

Since one and the same driver can have a different driving behavior on different journeys (e.g. as a result of changes of mind, different time pressure, different traffic density) or different drivers can use the same vehicle, it is often advantageous if the data for the various maneuver classes can also be reset to the "default" values again in accordance with option b) above.

In addition, the inventors propose a controller for a vehicle that is able to perform not only the method described but also the further methods set out above for driver-specific customization of a synthetically modulated speed profile.

The basis for recording the driving style is continuous evaluation of the speed profile that is actually used during a journey.

To this end, the "online" speed classifier of the method for identifying the driving style that is presented here compares the speed profile that is actually used with the profile from the forecast data for navigation (long-range predictive path data, abbreviated by LR-PSD) during the journey. The forecast data are conditioned inside the vehicle (see also patent application DE 10 2010 047 080.5 A1) and transmitted to a self-teaching algorithm.

As already mentioned above, the method described in the patent application DE 10 2010 047 080.5 A1 takes the forecast data for navigation (LR-PSD) and computes a speed profile that takes account of a "default" data record. In this way, acceleration and deceleration phases for a "default" driver and also further events such as stopping processes are incorporated into the profile, which results in the speed profile shown in FIG. 3, for example.

The insertion of the stopping processes is based on statistically ascertained values, so that in reality it is possible for discrepancies to arise both as far as the position of the stopping process and as far as the value of the deceleration, acceleration and the length of the standstill phases are concerned. The inserted acceleration and deceleration processes between two phases of constant speed may likewise have discrepancies, for example as a result of the driving style, from the real profile. It is therefore necessary for the "online" speed classifier of the method described here to compare the real profile with the raw data of the digital map. The raw data have an unsteady speed profile without transition phases between constant speed maneuvers.

Figure 4:
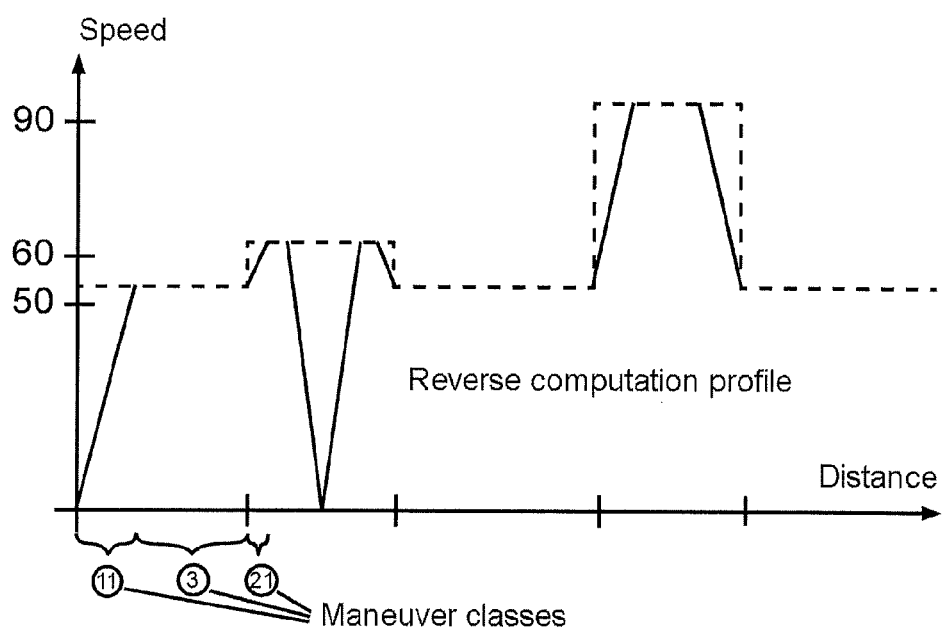
FIG. 4 shows an example of reverse computation of the steady speed profile to obtain an unsteady profile exclusively including constant speeds.

If the raw data are no longer available to the self-teaching algorithm in the vehicle, reverse computation from the speed profile computed using the method according to DE 10 2010 047 080.5 A1 is required in order to obtain the original forecast data for the LR-PSD. The reverse computation is performed by analyzing the phases of constant speed. By way of example, FIG. 4 shows how the transition phases are covered by an extension of the constant phases.

Figure 5:
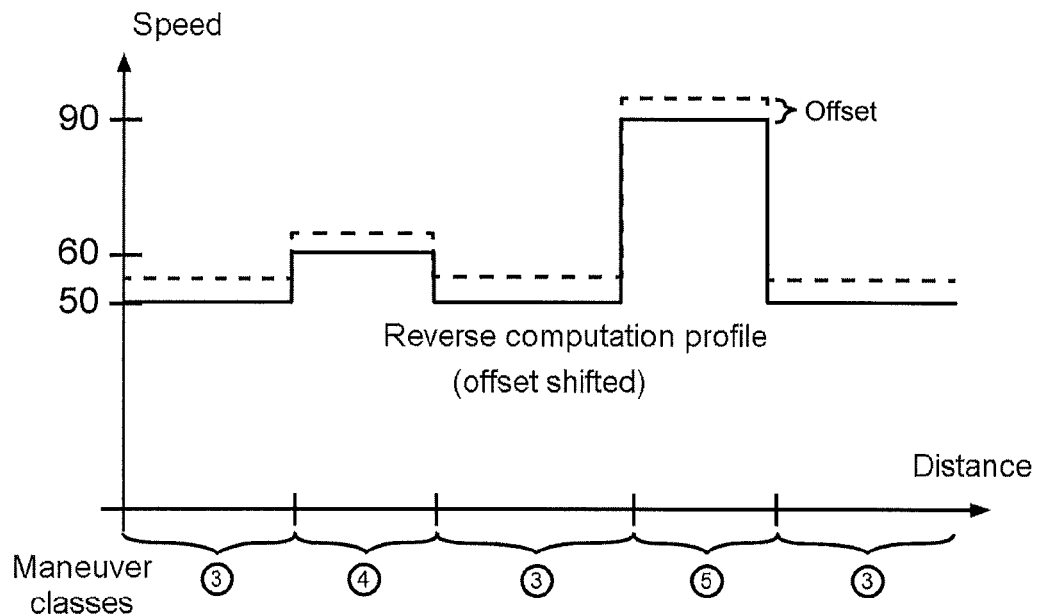
FIG. 5 shows raw data that have been computed from the revised profile shown in FIG. 3.

The reverse-computed profile is additionally shifted by a speed offset. Hence, the speed is matched to the legal speed limit that actually obtains. This results in the profile shown in FIG. 5 with the associated class distribution, which exclusively includes phases of constant speed.

The "online" speed classifier is used for "online" evaluation and conditioning of the measurement data for the driver-specific customization of the maneuver class matrix that takes place later. For this purpose, the "online" speed classifier determines the maneuver classes that have occurred and ascertains the average speed or average acceleration determined on the basis of the maneuver classes. In addition, it is output how frequently the respective speed class has occurred on the current journey to date. The input variables used for the "online" speed classifier in this case are the current vehicle speed, the maneuver classes computed on the basis of the speed that is output by the navigation appliance and a trigger signal that is needed for correct assignment in the case of mean value computation.

In principle, the "online" speed classifier contains two important functions, namely the determination of the maneuver class, and the determination of the characterizing values for the previously detected maneuver class (average values and frequency of occurrence of the maneuver classes).

These functions are described in more detail below.

For the purpose of determining the maneuver classes, the speed signal is processed and evaluated. To this end, the signal is first of all conditioned for further processing using different filters. The aim of this approach is to reduce the dynamics within the speed signal so as to prevent the later detection of small, irrelevant changes in the speed signal from being adversely affected. The filters used can be a "moving average" filter and a PT1 filter, for example. However, the use of other (more complex) filters is also possible. The only crucial factor for the choice of filters is that the desired signal quality is achieved.

The maneuver classes are then determined on the basis of acceleration, which is computed by differentiating the speed signal. The actual detection of the three basic classes then takes place. These are (i) constant speed, (ii) acceleration and (iii) deceleration.

To this end, the acceleration is compared with limit values that are based on the basic class detected in the previous time increment. The customization of the limit values results in a kind of hysteresis. This affords the advantage that an undesirable, continual change between two classes is avoided.

When the change to a new basic class is detected, the instantaneous vehicle speed is additionally ascertained. This speed is the initial speed for the current basic class and the final speed of the previous basic class. Hence, conclusion of each basic class can be followed by determination of the initial and final speeds thereof.

Finally for determining the maneuver class, the initial and final speeds that have just been detected are taken as the basis for using a lookup table to determine the associated maneuver class. In this case, the speeds are assigned to the defined speeds of the maneuver classes using the "nearest neighbor" method.

Following determination of the maneuver class, the characterizing values are determined. This requires a fundamental distinction to be made between acceleration maneuver classes and constant speed maneuver classes.

For the acceleration maneuver classes, the average acceleration is computed. To this end, all accelerations ascertained during the maneuver class are added and then divided by the number of measured values. In addition, the occurrence of a maneuver class prompts a counter to be incremented in order to determine how frequently a maneuver class has occurred on the journey to date.

When a constant speed class occurs, the average speed is determined instead of the average acceleration. Similarly, the frequency of the individual constant speed classes is determined. However, in this case, the two characterizing variables are computed not for the class detected on the basis of the speed traveled but rather for the constant speed class ascertained before the journey on the basis of the digital map. This is explained below using an example that is shown in FIG. 6.

Figure 6:
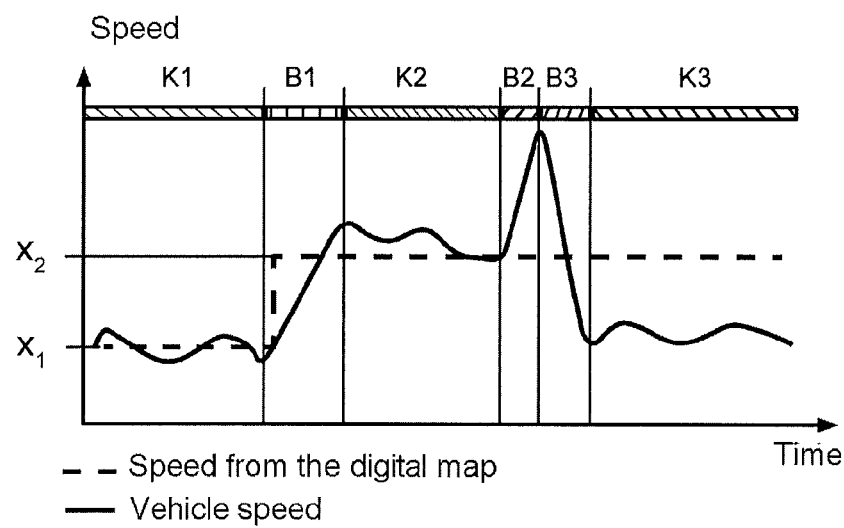
FIG. 6 shows an example of the computation of the average speed.

In the example shown in FIG. 6, the speed that is output by the digital map (dashed line) and the vehicle speed traveled (solid line) are firstly shown.

First, a total of three constant speed maneuver classes (K1, K2, K3) and three acceleration maneuver classes (B1, B2, B3) have been detected. For the three acceleration maneuver classes, the average acceleration is ascertained, as is described above.

The constant speed class K1 is now considered first of all. This similarly involves computation of the average speed, which is then assigned to the constant speed maneuver class $x_1$. For the ranges K2 and K3, in which constant speeds have likewise been detected, the average speed is likewise ascertained. However, a common average speed, which is assigned to the constant speed maneuver class $x_2$, is then computed from both average speeds. This assignment is made even though the speed traveled means that actually the same maneuver class is detected in the range K3 as in the range K1. For the assignment of the average speeds, it is therefore exclusively significant which maneuver class has been ascertained on the basis of the data from the digital map, rather than which class has been identified on the basis of the initial and final speeds.

Computation of the average values may encounter a situation in which the speed from the digital map is not directly available, rather only a computed speed profile. On the basis of this speed profile, however, reverse computation of the original speed profile of the digital map is possible.

The data record for modulating the speed profile, as can be created in accordance with DE 10 2010 047 080.5 A1, contains all of the information required, such as initial and final speeds, for all maneuvers.

DE 10 2012 004 258.2, which is not a prior publication, describes how the speed and acceleration values that are in the maneuver class matrix can be ascertained for the maneuver classes (e.g. $Øv_{Constancy}$ for $n_{Constancy}$). Reference is made once again here to the above explanations pertaining to DE 10 2012 004 258.2.

Figure 7:
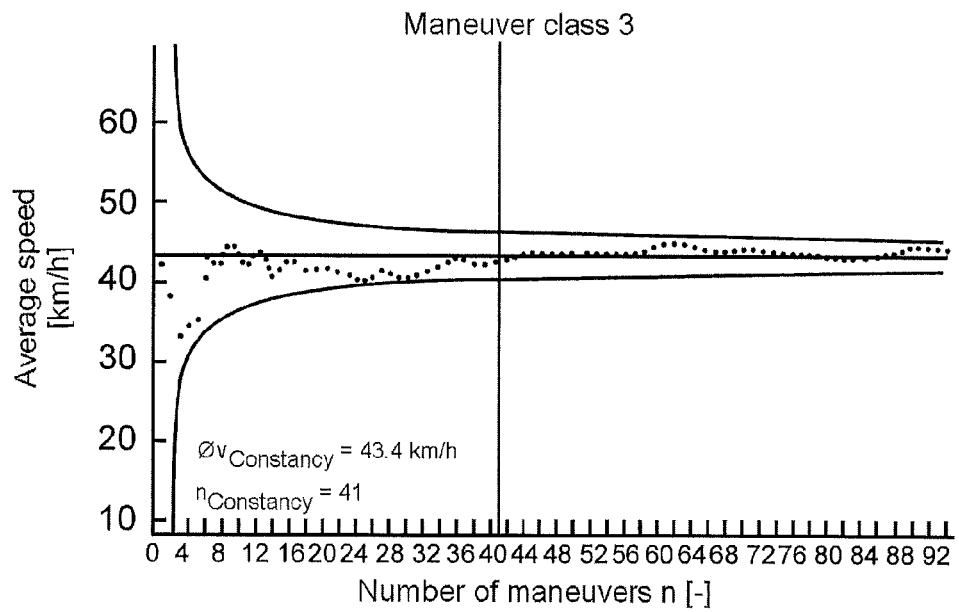
FIG. 7 shows a schematic illustration of the computation of the average speed for a maneuver at constant speed.

FIG. 7 schematically shows an illustration of the computation of the average speed for a maneuver at constant speed for a maneuver class at constant speed in accordance with DE 10 2012 004 258.2. The values for the average speed, the required number of repetitions to achieve constancy and the tolerance bands, described by three parameters, are stored in the maneuver class matrix for all maneuvers with "default" values for a "default" driver in the vehicle.

When, by way of example, the algorithm described in the patent application DE 10 2010 047 080.5 A1 identifies the maneuver class 3 shown in FIG. 7 for a path segment, for example, a speed of 43.4 km/h is used for this path segment in the modulated speed profile.

That is to say: $v_{Modulated} = Øv_{Constancy} = 43.4$ km/h

These "default" values ascertained by the method described in the patent application DE 10 2012 004 258.2 are matched to the respective driving style online by the method described here.

During the journey, the "online" speed classifier analyzes the speed profile actually used. In this case, the average speed $Øv$ and average acceleration $Øa$ are determined for each maneuver class on the basis of the measured values n.

The average speed and acceleration values (averaged over the tally of occurrence) ascertained by the "online" speed classifier for the individual maneuver classes can then be compared with the original "default" values.

Figure 8:
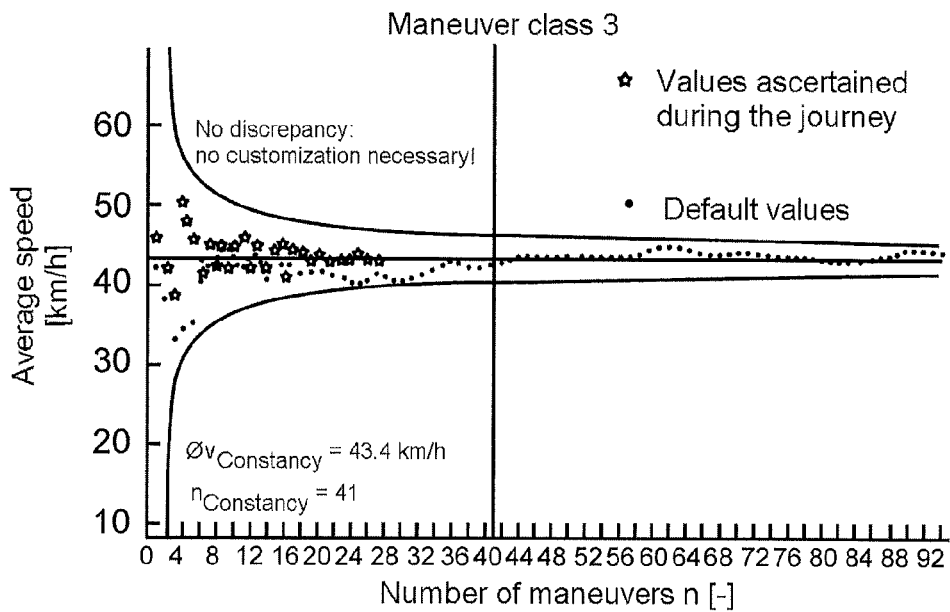
FIG. 8 shows a comparison of the current speed values ascertained "online" for maneuver class 3 in relation to the values stored in the maneuver class matrix.
Figure 9:
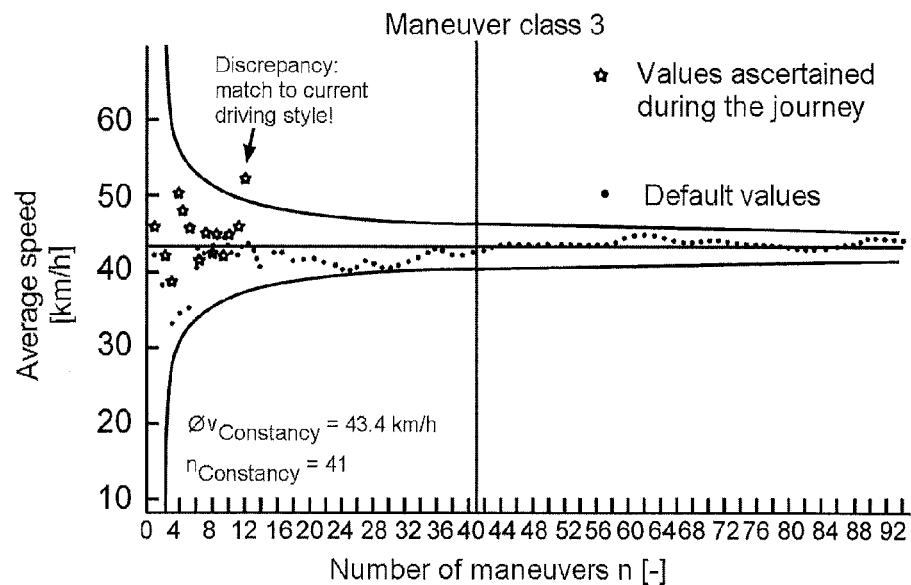
FIG. 9 shows a comparison of the current speed values ascertained "online" for maneuver class 3 in relation to the values stored in the maneuver class matrix.

By way of example for a maneuver class, in this case a constant speed maneuver at $Øv_{Constancy} = 43.4$ km/h, FIG. 8 and FIG. 9 show how the values ascertained during the journey are compared with the "default" values.

FIG. 8 shows the case in which the current driving behavior (indicated by little stars) for the maneuver class 3 characterized by the average speed has only minor discrepancies from the "default" value $Øv_{Constancy}$ (=43.4 km/h). The current values for the average speed in maneuver class 3 are within the tolerance band in this example. Therefore, there is no need for customization of the driving style for the maneuver class 3 in the database.

By contrast, FIG. 9 shows the case in which the current driving behavior (indicated by little stars) with the average speed characteristic curve for n=13 has a large discrepancy from the "default" value $Øv_{Constancy}$ (=43.4 km/h). This value for the average speed in maneuver class 3 is outside the tolerance band in this example. Therefore, there is a need for matching to the current driving style for maneuver class 3 in the database.

The evaluation of the average speed (on the basis of occurrence) during the journey, as shown schematically in FIG. 8 and FIG. 9 and described above, can be reset whenever a journey is started. This means that whenever a journey is started the evaluation of the average speed can begin afresh, that is to say at n=1. This allows the current driving behavior to be recorded on every journey, which is important because one and the same driver can also have a different driving behavior (e.g. as a result of changes of mind, different time pressure, different traffic density).

If, as described above and shown in FIG. 9, customization is necessary for a maneuver in the database, an offset value Δv (this has the "default" value Δv=0 in the default maneuver class matrix for all maneuver classes at constant speed) is advantageously written to the maneuver class matrix.

Figure 10:
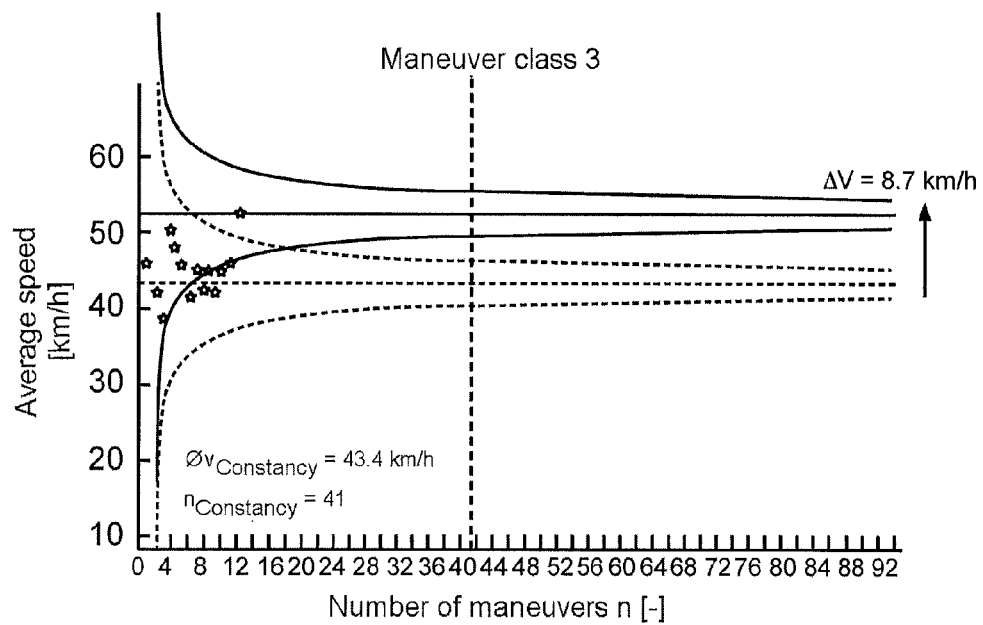
FIG. 10 shows an example of a shift in the average speed and in the tolerance band as a result of the current driving style.

In the example shown in FIG. 9 and FIG. 10, the driver-typical speed offset would be Δv=8.7 km/h. For subsequent modulation of a speed profile for the maneuver class 3, this results in the following speed that is to be used:

$$v_{Modulated} = \emptyset v_{Constancy} + \Delta v = 43.4 \text{ km/h} + 8.7 \text{ km/h} = 52.1 \text{ km/h}$$

The advantage of recording the driving-style-dependent alteration as an offset rather than as an absolute value in the maneuver class matrix is that there is an opportunity to reset the maneuver class matrix to the "default" data input again and to reject what has been learned if it is identified that what has been learned is flawed or obsolete.

The storage of absolute values would require the "default" data input to be overwritten and it would not be possible to reset the database. Alternatively, it would be possible to reset the database only by separate storage of the default maneuver class matrix, which results in double the memory requirement (for example in a controller), however. Depending on the application, the proposals allow both methods to be applied (storage of an offset or of absolute values; with and without separate storage of the default maneuver class matrix), however.

The tolerance bands are likewise shifted by adding the offset Δv. In principle, for each maneuver class, the curve that shows the upper limit of the tolerance band is described by the following equation 1:

$$T = \frac{1}{a \times n + b} + c$$

(Equation 1; formal relationship to describe the upper limit of the tolerance band)

The parameters a, b and c can then be specifically selected for each maneuver class and stored in the maneuver class matrix. The lower limit of the tolerance band is obtained by mirroring the upper limit on the straight line for $\emptyset v_{Constancy}$.

The shift in the tolerance band is obtained by adding the original value of the parameter c and the driving-style-dependent offset Δv. If Δv≠0, the above formula for the upper limit of the tolerance band changes as follows:

$$T = \frac{1}{a \times n + b} + c + \Delta v$$

(Equation 2; formal relationship to shift the tolerance band in the case of static driving maneuvers)

Even the description of the shift in the tolerance band by the offset Δv results in the advantage that the driving behavior learned during the journey can be reset. If a maneuver class has an offset shift in the speed, including the tolerance band, it is also possible for the evaluation described in FIG. 8 and FIG. 9 to be continued using the shifted tolerance band or to be begun with the "default" values when a journey is next started.

In order to record the driving style for nonstatic driving maneuvers (acceleration and deceleration maneuvers), it is possible to use the same method as for static maneuvers. This is possible because nonstatic maneuvers are characterized by the same "default" values as constant speed maneuvers. The only difference between static and nonstatic maneuver classes is that acceleration and deceleration values (Øa) are involved instead of speed values (Øv).

In the case of nonstatic maneuvers, the average acceleration or deceleration is likewise ascertained on the basis of the repetitions (n) for a "default" driver and stored in the database (default maneuver class matrix). In a similar manner to the method for static maneuvers, the tolerance bands are also described by three parameters (cf. equation 1) and stored in the maneuver class matrix.

Figure 11:
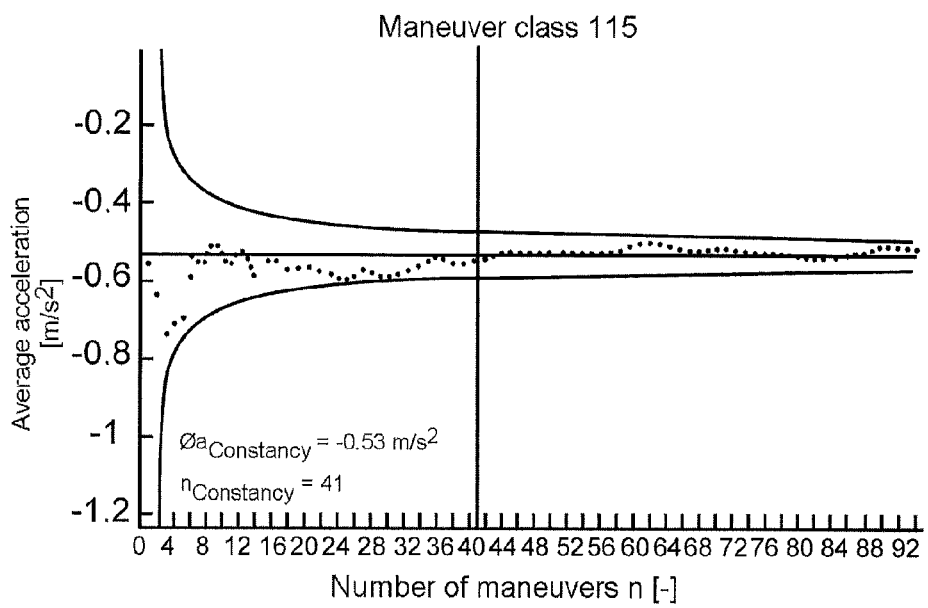
FIG. 11 shows a schematic illustration of the computation of the average deceleration for a transient maneuver.

FIG. 11 schematically shows the ascertainment of the average deceleration for a deceleration maneuver on the basis of the repetitions. The method is described in the patent application DE 10 2012 004 258.2.

Since the nonstatic maneuvers are described by the same values as the static maneuvers, it is possible to use the same evaluation algorithm.

This means that the acceleration and deceleration values for the driver that are ascertained during the journey can be compared with the "default" values in exactly the same way as is the case for constant speed maneuvers. This is shown by way of example for the maneuver class 115 in FIG. 12 and FIG. 13.

Figure 12:
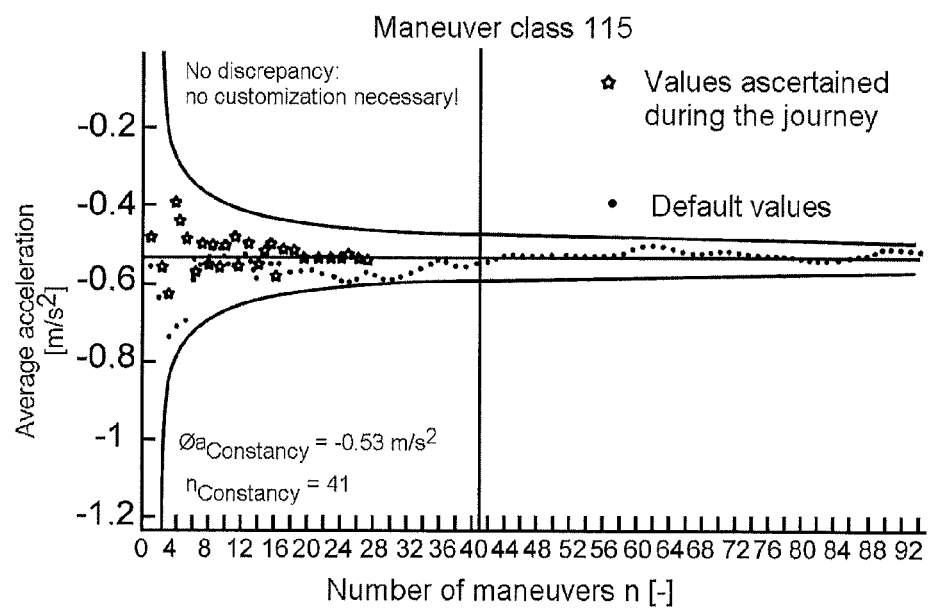
FIG. 12 shows a first comparison of current acceleration values ascertained "online" for maneuver class 115 in relation to the values stored in the maneuver class matrix.
Figure 13:
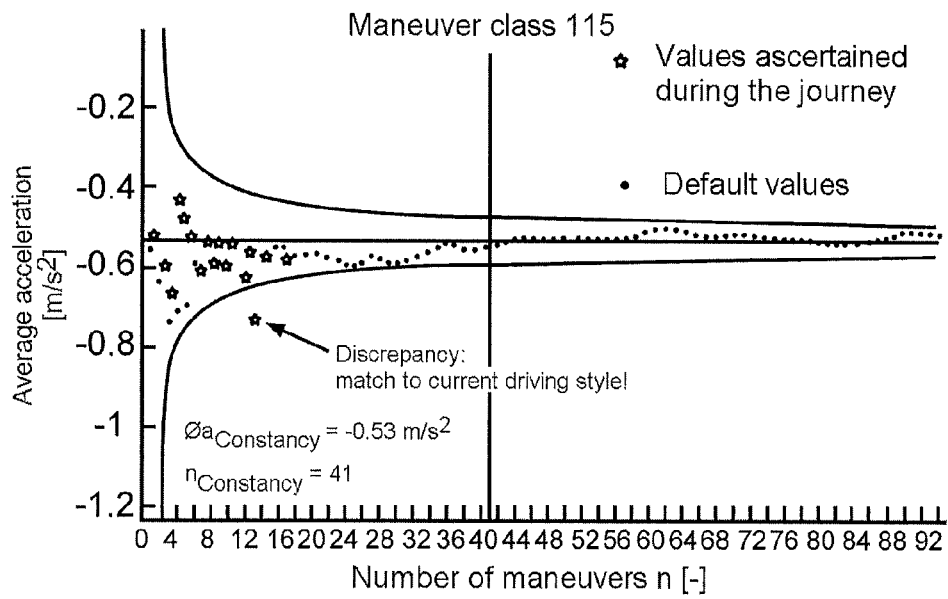
FIG. 13 shows a second comparison of current acceleration values ascertained "online" for the maneuver class 115 in relation to the values stored in the maneuver class matrix.

As already described above for constant speed maneuvers, the current driving behavior can be evaluated in comparison with the behavior originally stored in the maneuver class matrix. Thus, by way of example, FIG. 12 shows that the current deceleration values ascertained online for the maneuver class 115 have only a slight discrepancy from the original values and there is no need to customize the driving style in the maneuver class matrix. FIG. 13, on the other hand, shows an example relating to the case in which the deceleration values ascertained online for the maneuver class 115 differ significantly for n=13 and breach the tolerance band. In this case, it is necessary to match the data for the maneuver class 115 to the current driving style.

The evaluation of the average acceleration or deceleration (on the basis of occurrence) during the journey, as shown schematically in FIG. 12 and FIG. 13, can be reset for every start of the journey. This means that whenever a journey starts it is possible for the evaluation of the average acceleration or deceleration to begin afresh, that is to say at n=1. As a result, the current driving behavior can be recorded on every journey, which is important because one and the same driver can also have a different driving behavior (e.g. as a result of changes of mind, different time pressure, different traffic density).

Figure 14:
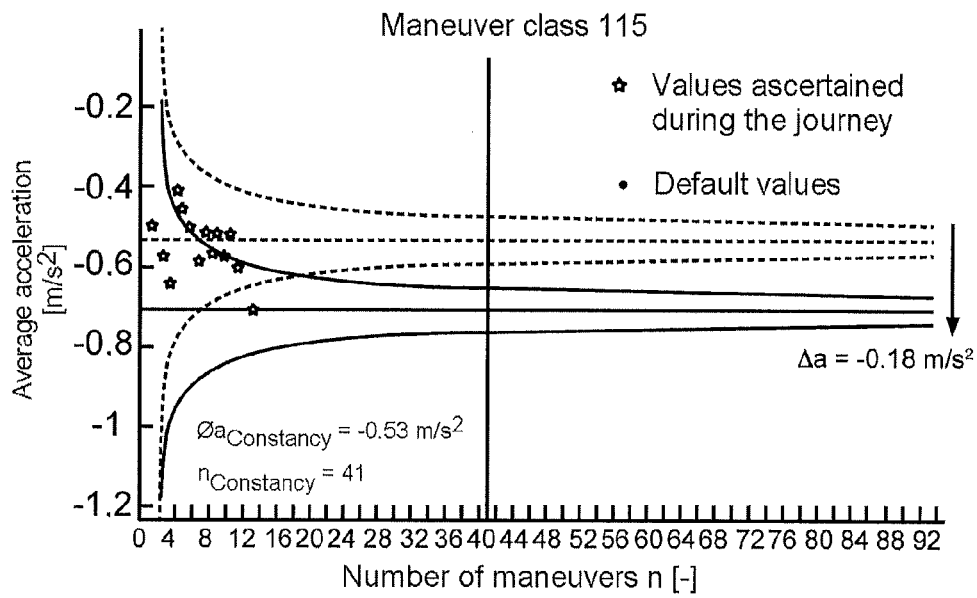
FIG. 14 shows an example of a shift in the average deceleration and in the tolerance band as a result of the current driving style.

The way in which the average acceleration or deceleration can shift as a result of the current driving style is shown in FIG. 14. In this case, the same relationships are used for nonstatic maneuver classes as for maneuver classes at constant speed. This means that the default value for $\emptyset a_{Constancy}$ in the maneuver class matrix does not need to be altered, but rather the current value for Δa can be written to the maneuver class matrix. The "default" value for Δa is 0 for all nonstatic maneuver classes in the default maneuver class matrix.

In the example shown here (see FIG. 13 and FIG. 14), the following formal relationship is obtained for the maneuver class 115:

$$a_{Modulated} = \emptyset a_{Constancy} + \Delta a = -0.53 \text{ m/s}^2 - 0.18 \text{ m/s}^2 = -0.71 \text{ m/s}^2$$

This means that for the next speed modulation for which the maneuver class 115 occurs a deceleration of 0.71 m/s² is used instead of the original 0.53 m/s².

The tolerance band is described by the same formal relationship for nonstatic maneuvers as for static maneuver classes, cf. equation 1. If a nonstatic maneuver class requires matching to the current driving behavior, it is also necessary for the tolerance band to be shifted. To this end, the same approach is used for the nonstatic maneuver classes as for the static maneuver classes. The formal relationship to shift the tolerance band in the case of the nonstatic maneuver classes is then obtained as follows:

$$T = \frac{1}{a \times n + b} + c + \Delta a$$

(Equation 3; formal relationship to shift the tolerance band in the case of nonstatic driving maneuvers)

If a nonstatic maneuver class has an offset shift in the acceleration or deceleration, including the tolerance band, it is also possible to continue the evaluation described in FIG. 12 and FIG. 13 using the shifted tolerance band or to begin with the default values again when the journey is next started.

If the customization of the values from at least one maneuver class exceeds a prescribable threshold value for an energy-related relevance, recomputation of the predictive operating strategy for the vehicle is advantageously performed. There are no special limitations for the threshold value and it is possible to assume an "energy-related relevance", for example, when the energy consumption over the selected path on account of the current driving style of the driver is 1, 2, 3, 4, 5, 6, 7, 8, 9, 10, 15 or 20% above or below that which has been computed in advance for a selected path on the basis of the "default" values in the maneuver class matrix.

The proposed controller for the vehicle is set up to perform the above-described driver-specific customization of a synthetically modulated speed profile in all its embodiments. This controller may be the one that is used for adapting the traffic-flow-conditioned stopping processes, or a different controller. Since the components required for the controller, and the function and interaction of said components are quite evident to a person skilled in the art from the above explanations, they do not need to be discussed in more detail at this juncture.

The controller for performing the driver-specific customization of a synthetically modulated speed profile may have a memory device, an operator control apparatus, a data processing device and a measurement data capture device, for example, wherein
a) the memory device stores a plurality of maneuver classes, wherein for each maneuver class at least an input speed, an output speed, an average speed or average acceleration of the vehicle and also a tolerance band for the average speed or average acceleration on the basis of the number of repetitions of the maneuver are stored;
b) the operator control apparatus can be used to select a route, wherein the paths required therefor are either stored in the memory device or based on map data from a navigation system;
c) the data processing device can be used to assign at least one maneuver class to each path segment of the route;
d) the measurement data capture device can be used to record the actual speed or actual acceleration at which a driver drives through the path segments;
e) the data processing device can be used to compare whether, in relation to the tally of how often the maneuver class has occurred, the actual speed or the actual acceleration is outside the tolerance band stored in the memory device for the tally of the maneuver class, and
f) the data processing device can be used to customize the average speed or average acceleration stored in the memory device for the maneuver class, and also the tolerance band, if, in relation to the tally of how often the maneuver class has occurred, the actual speed or the actual acceleration is outside the tolerance band stored in the memory device for the maneuver class.

Furthermore, provision may advantageously be made for the data processing device provided in the controller to customize the values for a maneuver class by entering offset values into the memory device. In addition, the data processing device can advantageously perform recomputation of the operating strategy if the customization of the values from at least one maneuver class exceeds a prescribable threshold value for an energy-related relevance.

It is also possible for the data processing device a) to use the customized values for computing the predictive operating strategy for at least one further selected path or b) to reset the customized values in the maneuver class matrix to the originally prescribed values after the journey has ended and to compute the predictive operating strategy for a further selected path on the basis of the originally prescribed values.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for traffic-flow-conditioned adaptation of stopping processes to suit a synthetically modulated speed profile along a path taken by a vehicle, comprising:
   selecting a path based on map data stored in a data record;
   splitting the path into path segments and producing a synthetically modulated speed profile for each path segment;
   travelling along at least one portion of the path by a driver in the vehicle;
   producing recorded stopping processes by recording how many times and for how long the vehicle stops in the path segments taken when travelling along the at least one portion of the path; and
   adapting the synthetically modulated speed profile for at least one path segment to suit the recorded stopping processes, wherein
   the synthetically modulated speed profile is produced by assigning a maneuver class to each path segment, each maneuver class being selected from a matrix of maneuver classes that contains a plurality of constant speed maneuver classes, a plurality of acceleration maneuver classes and a plurality of deceleration maneuver classes,
   each maneuver class in the matrix of maneuver classes has an associated input speed and an associated output speed of the vehicle,
   each maneuver class in the matrix of maneuver classes has an average speed or has average acceleration/deceleration of the vehicle, and
   each maneuver class in the matrix of maneuver classes has a tolerance band for the average speed or average acceleration/deceleration based on a tally of how many times the maneuver class has occurred so far while travelling on the path.

2. The method as claimed in claim 1, wherein adapting the synthetically modulated speed profile for at least one path segment comprises:
if the recorded stopping process occurred during one of the constant speed maneuver classes, the recorded stopping process is associated with the constant speed maneuver class,
if the recorded stopping process occurred during one of the deceleration maneuver classes, the recorded stopping process is associated with a constant speed maneuver class that occurred before the deceleration maneuver class, or
if the recorded stopping process occurred during one of the acceleration maneuver classes, the recorded stopping process is associated with a constant speed maneuver class that occurred after the acceleration maneuver class.

3. The method as claimed in claim 1, wherein for each recorded stopping process, how long the vehicle stops is stored in a memory and a maneuver-class-specific counter for the recorded stopping processes is incremented by 1.

4. The method as claimed in claim 1, wherein
the synthetically modulated speed profile is adapted for the at least one path segment by producing an adapted value, and
the adapted value for the at least one path segment is used for a predictive operating strategy for the vehicle.

5. The method as claimed in claim 4, wherein
the vehicle is a plug-in hybrid vehicle, and
the predictive operating strategy comprises controlling a changeover between purely electric driving and hybrid driving.

6. The method as claimed in claim 4, wherein the predictive operating strategy is to achieve a maximum consumption potential of for a plug-in hybrid vehicle.

7. The method as claimed in claim 4, wherein
if the adapted value for the at least one path segment results in a predictive operating strategy that exceeds a prescribable threshold value for an energy-related relevance, the predictive operating strategy is recomputed.

8. The method as claimed in claim 4, wherein
the adapted value is used to modify an originally prescribed value in an original maneuver class of the matrix of maneuver classes, and
the adapted value:
is used for at least one path segment of a future route for computing the predictive operating strategy, or
is ignored for at least one path segment of a future route such that the original maneuver class is reset to the originally prescribed value after a journey has ended, and the predictive operating strategy for the future route is computed based on the originally prescribed value.

9. The method as claimed in claim 8, wherein the adapted value is ignored when there is at least one of a change in driver, a change in time of day at which the vehicle is being driven, a change in traffic volume and a change in driving style.

10. The method as claimed in claim 1, wherein
adapting the synthetically modulated speed profile comprises associating a speed or acceleration/deceleration offset with the maneuver class assigned to the at least one path segment.

11. The method as claimed in claim 1, wherein
the average speed or average acceleration/deceleration for each maneuver class is produced by collecting a number of default values, each default value being produced by executing the maneuver class and recording the speed or acceleration/deceleration, and
the tolerance band for the average speed or average acceleration/deceleration is based on the number of default values used to calculate the average speed or average acceleration/deceleration.

12. The method as claimed in claim 1, wherein
the synthetically modulated speed profile is adapted for a plurality of path segments by producing respective adapted values,
the adapted values are respectively used to modify originally prescribed values in respective maneuver classes of the matrix of maneuver classes, and
the originally prescribed values are developed based on a default driver driving a default vehicle in each of the maneuver classes such that the originally prescribed values relate to an average driver.

13. The method as claimed in claim 1, wherein adapting the synthetically modulated speed profile for at least path segment produces at least one customized maneuver class, which is used for subsequent determinations of a predictive operating strategy of the vehicle.

14. A vehicle controller for traffic-flow-conditioned adaptation of stopping processes to suit a synthetically modulated speed profile along a path taken by a vehicle, the controller comprising a processor configured to:
select a path based on map data stored in a data record;
split the path into path segments and producing a synthetically modulated speed profile for each path segment;
produce recorded stopping processes by recording how many times and for how long the vehicle stops in the path segments taken when travelling along the at least one portion of the path; and
adapt the synthetically modulated speed profile for at least one path segment to suit the recorded stopping processes, wherein
the synthetically modulated speed profile is produced by assigning a maneuver class to each path segment, each maneuver class being selected from a matrix of maneuver classes that contains a plurality of constant speed maneuver classes, a plurality of acceleration maneuver classes and a plurality of deceleration maneuver classes,
each maneuver class in the matrix of maneuver classes has an associated input speed and an associated output speed of the vehicle,
each maneuver class in the matrix of maneuver classes has an average speed or has average acceleration/deceleration of the vehicle, and
each maneuver class in the matrix of maneuver classes has a tolerance band for the average speed or average acceleration/deceleration based on a tally of how many times the maneuver class has occurred so far while travelling on the path.

* * * * *